United States Patent
Seta et al.

(10) Patent No.: US 9,457,663 B2
(45) Date of Patent: Oct. 4, 2016

(54) DISPLAY DEVICE FOR VEHICLE

(71) Applicant: Fuji Jukogyo Kabushiki Kaisha, Tokyo (JP)

(72) Inventors: Itaru Seta, Tokyo (JP); Yosuke Ohtomo, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/506,571

(22) Filed: Oct. 3, 2014

(65) Prior Publication Data
US 2015/0106002 A1 Apr. 16, 2015

(30) Foreign Application Priority Data

Oct. 10, 2013 (JP) ................................. 2013-212552

(51) Int. Cl.
*B60K 35/00* (2006.01)
*B60W 40/00* (2006.01)
*B60W 30/18* (2012.01)
*B60W 50/14* (2012.01)

(52) U.S. Cl.
CPC .............. *B60K 35/00* (2013.01); *B60W 40/00* (2013.01); *B60K 2350/1092* (2013.01); *B60W 30/18127* (2013.01); *B60W 2050/146* (2013.01); *B60W 2510/083* (2013.01)

(58) Field of Classification Search
CPC ......... B60K 35/00; B60K 2350/1092; B60W 40/00; B60W 2050/146; B60W 30/18127; B60W 2510/083

USPC .......................................................... 701/123
See application file for complete search history.

(56) References Cited

U.S. PATENT DOCUMENTS

| 7,847,501 | B2 * | 12/2010 | Baglino et al. ................ 318/432 |
| 8,718,913 | B2 * | 5/2014 | Crombez ....................... 701/123 |
| 8,970,147 | B2 * | 3/2015 | Baglino et al. ........... 318/400.09 |
| 2010/0030413 | A1 | 2/2010 | Jinno |
| 2014/0077941 | A1 | 3/2014 | Yamamura et al. |

FOREIGN PATENT DOCUMENTS

| WO | 2008/056529 | 5/2008 |
| WO | 2012/153395 | 11/2012 |

* cited by examiner

*Primary Examiner* — Brian P Sweeney
(74) *Attorney, Agent, or Firm* — Smith, Gambrell & Russell, LLP

(57) ABSTRACT

A vehicle speed acquisition unit acquires speed information indicating a vehicle speed. An output acquisition unit acquires output information indicating an output of a drive unit that drives the vehicle. An output rate derivation unit derives an output rate indicating a ratio of the output to a rated output of the vehicle at the current vehicle speed. A waste derivation unit derives waste information indicating a degree of waste of energy consumed by the vehicle. A display unit displays a waste status of the energy. When the speed is within a predetermined speed range and the output rate is within a preset first output range, the waste derivation unit derives the waste information indicating that the waste of energy when the speed is high is less than when the speed is low, even when the output rate is the same.

18 Claims, 5 Drawing Sheets

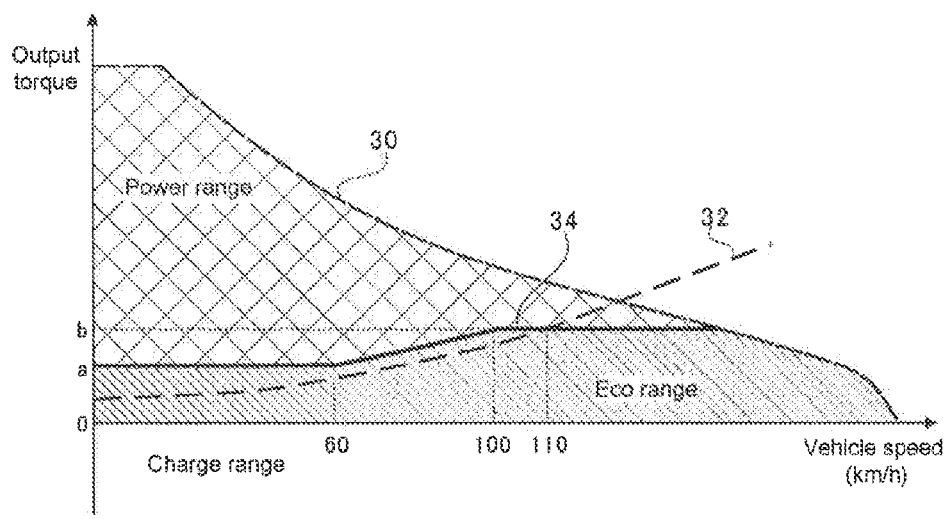

DISPLAY DEVICE FOR VEHICLE

CROSS-REFERENCE TO RELATED APPLICATIONS

The present application claims priority from Japanese Patent Application No. 2013-212552 filed on Oct. 10, 2013, the entire contents of which are hereby incorporated by reference.

BACKGROUND

1. Technical Field

The present invention relates to a display device for a vehicle that displays information on energy consumed by the vehicle.

2. Related Art

Electric automobiles that carry a battery and are driven by a motor powered by the battery, and hybrid automobiles that are driven by a motor and an engine started getting popular in recent years. For example, WO 2012/153395 and WO 2008/056529 propose display devices for a vehicle that display drive power of a motor transmitted to the wheels of such a vehicle.

In such display devices for a vehicle, a running mode is determined according to the drive power, so that where the drive power is equal to or higher than a threshold, a power mode is determined, and where the driver power is less than the threshold, an eco mode is determined, and the determined running mode can be made visible.

It is essentially desirable that a driver be notified of the running mode, such as the eco mode or power mode, so that the waste of energy supplied from a battery or fuel could be suppressed. However, in the display devices for a vehicle disclosed in the aforementioned WO 2012/153395 and WO 2008/056529, only the value of the drive power is displayed.

In the abovementioned display devices for a vehicle, for example, where the vehicle is driven on a steeply ascending road, the drive power increases and the power mode can be uniformly reported, and where the vehicle runs downhill, the drive power decreases and the eco mode can be uniformly displayed. Thus, the waste of energy in the running vehicle is difficult to suppress while referring to information, such as a running mode, that is displayed on the conventional display device for a vehicle.

SUMMARY OF THE INVENTION

Accordingly, it is an object of the present invention to provide a display device for a vehicle that can display information suitable for running the vehicle while suppressing the waste of energy.

An object of the present invention provides a display device for a vehicle that includes: a vehicle speed acquisition unit that acquires speed information indicating a vehicle speed; an output acquisition unit that acquires output information indicating an output of a drive unit that drives the vehicle; an output rate derivation unit that derives an output rate indicating a ratio of the output to a rated output of the vehicle at the current vehicle speed, on the basis of the speed information and the output information; a waste derivation unit that derives waste information indicating a degree of waste of energy consumed by the vehicle according to the speed information and the output rate; and a display unit that displays a waste status of the energy on the basis of the waste information, and in which when the speed is within a predetermined speed range and the output rate is within a preset first output range, the waste derivation unit derives the waste information indicating that the waste of energy when the speed is high is less than when the speed is low, even when the output rate is the same.

The waste derivation unit may derive a numerical value as the waste information from the speed information and the output rate, and the display unit may display whether a running state belongs to an power range indicating that the waste of energy is large or an eco range indicating that the waste of energy is small, according to the numerical value as the waste information.

The display unit may have a display area indicating the running state belonging to the eco range, and may indicate the degree of waste of energy by a current position that is identified and displayed in the display area.

When the output rate is in a third output range including 0, the display unit may stop and display the indication position at a predetermined position.

BRIEF DESCRIPTION OF THE DRAWINGS

FIG. 7 is an explanatory drawing illustrating in detail the power range and eco range of the display device for a vehicle of the present implementation;

FIG. 8 is an explanatory drawing illustrating a waste information derivation table.

DETAILED DESCRIPTION

Figure 1:
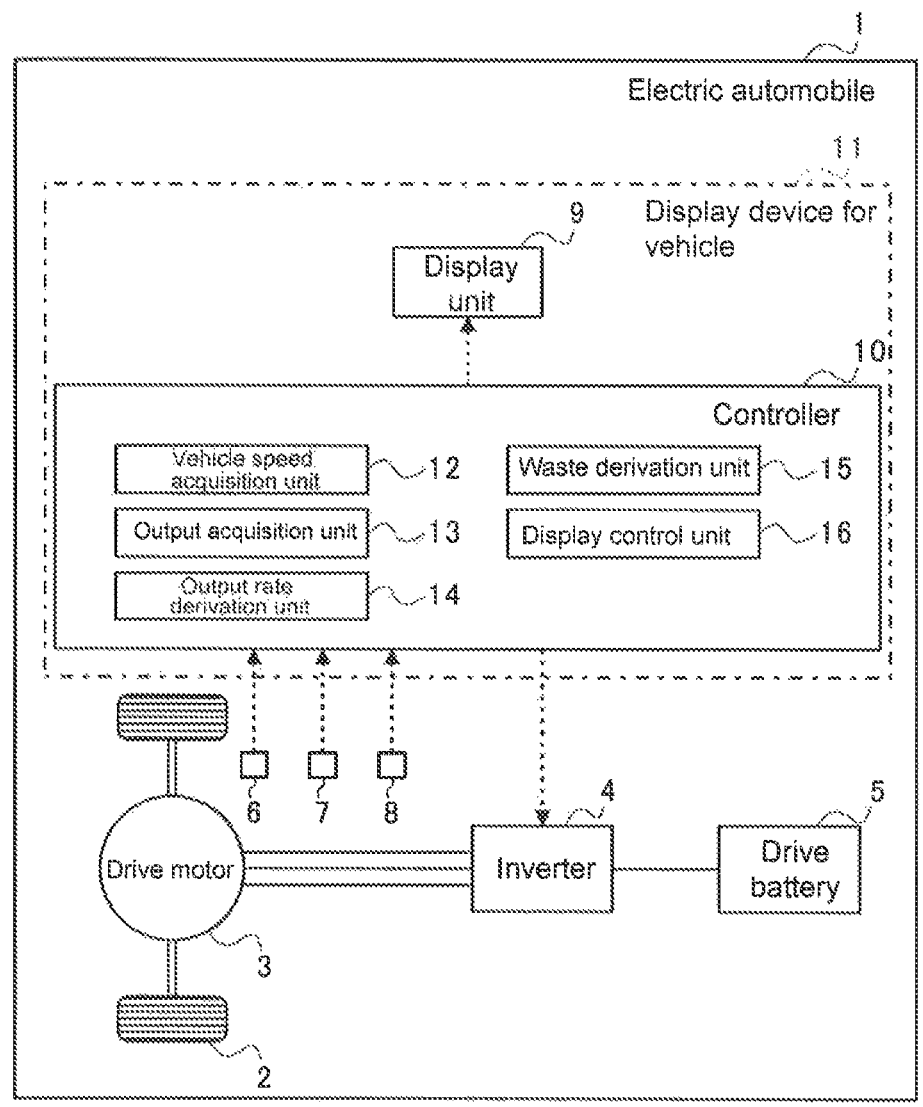
FIG. 1 illustrates the configuration of an electric automobile (vehicle)

The preferred implementation of the present invention will be described hereinbelow with reference to the appended drawings. The dimensions, materials, and other specific numerical values relating to the implementation are merely exemplary, serve to facilitate the understanding of the invention, and place no limitation on the present invention, unless specifically stated otherwise. The components having substantially the same functions and features in the description and appended drawings are assigned with the same reference numerals to avoid redundant explanation. Further, the components having no direct relation to the present invention are not depicted in the drawings.

FIG. 1 illustrates the configuration of an electric automobile (vehicle) 1. As indicated in FIG. 1, wheels 2 in the electric automobile 1 are connected to a drive motor (drive unit) 3. The drive motor 3 is connected through an inverter 4 to a drive battery 5 and rotated by the energy supplied from the drive battery 5. The electric automobile 1 runs as the wheels 2 are rotated by the drive motor 3.

A vehicle speed sensor 6 is, for example, a wheel speed sensor or a resolver, detects the rotation speed of the wheels 2, and outputs a signal indicating the rotation speed to a controller 10.

An acceleration sensor 7 detects the depression amount of an accelerator pedal and outputs a signal indicating the depression amount to the controller 10.

A brake sensor 8 detects the depression amount of a brake pedal and outputs a signal indicating the depression amount to the controller 10.

A display unit 9 is constituted by a meter installed at a dashboard, or the like, of the electric automobile 1. The display unit 9 displays information indicating the waste status of energy of the drive battery 5 which is consumed by the electric automobile 1 in response to control by the below-described display control unit 16. Described herein is the case in which the display unit 9 is constituted by a meter, but the display unit 9 may be the so-called digital meter that is constituted by an organic electro luminescence (EL) display and displays meter images.

The controller 10 is a microcomputer including a central processing unit (CPU), a random access memory (RAM), and a read only memory (ROM) and performing integrated control of the units. The controller 10 is connected to the vehicle speed sensor 6, the acceleration sensor 7, and the brake sensor 8 and inputs signals indicating the information detected by the sensors (6 to 8).

The controller 10 is also connected to the inverter 4 and controls the drive of the drive motor 3 through the inverter 4 on the basis of the signals input from the sensors (6 to 8).

More specifically, the controller 10 determines the torque requested by the user from the information detected by the sensors (6 to 8), and outputs a control instruction to the inverter 4 such as to control the drive motor 3 according to the requested torque.

The display unit 9 and the controller 10 constitute a display device 11 for a vehicle that derives and displays information on the energy consumed by the electric automobile 1.

The controller 10 deploys a program stored in the ROM to the RAM, executes the derivation and display processing of the information indicating the waste status of the energy consumed by the vehicle, and functions as a vehicle speed acquisition unit 12, an output acquisition unit 13, an output rate derivation unit 14, a waste derivation unit 15, and a display control unit 16. The processing of various functional units of the controller 10 will be described below in detail with reference to a flowchart.

Figure 2:
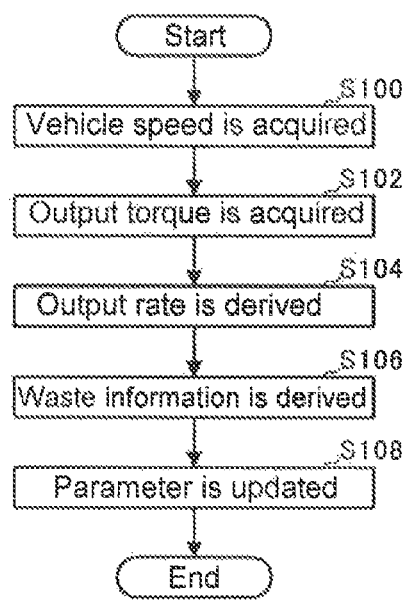
FIG. 2 is a flowchart illustrating the flow of derivation and display processing of information indicating the waste status of energy consumed by the vehicle.

FIG. 2 is a flowchart illustrating the flow of derivation and display processing of the information indicating the waste status of the energy consumed by the vehicle. As shown in FIG. 2, the vehicle speed acquisition unit 12 derives the vehicle speed on the basis of the signal from the vehicle speed sensor 6 and acquires speed information indicating the vehicle speed (S100). In the case described herein, the vehicle speed acquisition unit 12 derives the vehicle speed, but vehicle speed information derived by another device such as the vehicle speed sensor 6 may be transmitted to the vehicle speed acquisition unit 12.

The output acquisition unit 13 acquires output information indicating the output torque of the drive motor 3 that drives the electric automobile 1 (S102). More specifically, the output acquisition unit 13 considers the torque requested by the user as the output torque and takes the information indicating the requested torque as the output information. In the case described herein, the torque requested by the user is taken as the output torque, but for example, the output value of a torque sensor may be taken as the output torque.

The output rate derivation unit 14 derives an output rate indicating the ratio of the output to the rated torque (rated output, rated performance) of the drive motor 3 of the electric automobile 1 at the current vehicle speed on the basis of the speed information and output information (S104). The relationship between the rated torque and the vehicle speed is explained below with reference to FIG. 3, and the output rate is explained thereafter.

Figure 3:
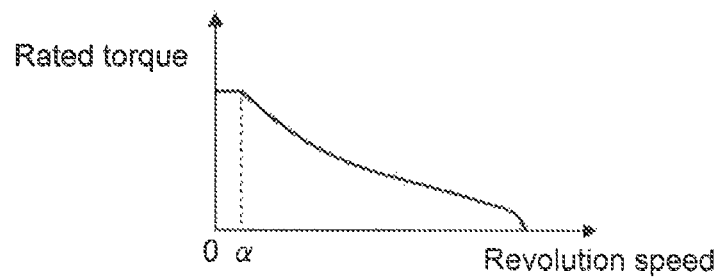
FIG. 3 is an explanatory drawing illustrating the characteristic of a drive motor.

FIG. 3 is an explanatory drawing illustrating the characteristic of the drive motor 3. As shown in FIG. 3, in the drive motor 3, the maximum value of the rated torque is constant till the revolution speed reaches a threshold $\alpha$, and where the revolution speed exceeds the threshold $\alpha$, the maximum value of the rated torque decreases as the revolution speed increases.

The output rate is a percentage obtained by dividing the output torque by the rated torque. For example, the output torque decreases as the revolution speed increases when the output rate is the same. Further, where the same output torque is maintained despite the increase in the revolution speed, the output rate increases. The output rate assumes a negative value when the drive battery 5 is charged.

As shown in FIG. 2, after the output rate derivation step S104, the waste derivation unit 15 derives the waste information indicating the degree of waste of the energy consumed by the vehicle according to the speed information and output rate (S106). The waste information will be described hereinbelow in greater detail.

The display control unit 16 then displays on the display unit 9 the waste status of the energy of the drive battery 5 which is consumed by the electric automobile 1 on the basis of the waste information (S108).

Figure 4:
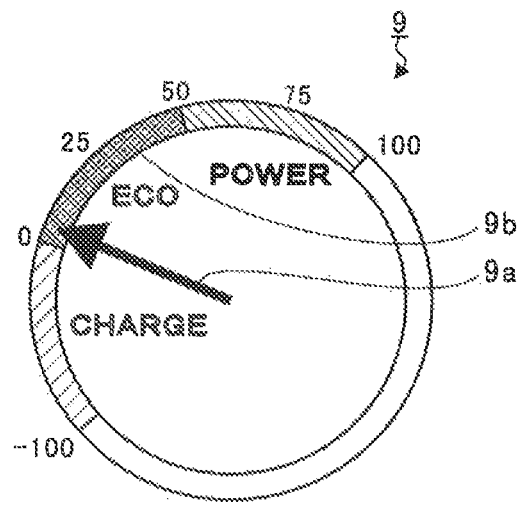
FIG. 4 illustrates a display example on a display unit.

FIG. 4 illustrates a display example of the display unit 9. The waste information is represented by a numerical value, and as shown in FIG. 4, the display unit 9 is a meter with an indication position changing according to the numerical value of the waste information. More specifically, the meter is provided with an indication member 9*a* of a shape that can specify an indication position, such as an arrow, and the indication position on the meter, which is indicated by the indication member 9*a*, corresponds to the numerical value of the waste information. The degree of the waste of energy is thus indicated by the numerical value of the waste information.

A charge range, an eco range, and a power range are set as ranges of the waste information. The charge range indicates a running state in which the drive battery 5 can be charged by the energy of the running vehicle, the eco range indicates a running state with a low waste of energy, and the power range indicates a running state with a large waste of energy.

In this case, the numerical values of waste information which are equal to or greater than −100 and less than 0 are taken as the charge range, the numerical values of waste information which are equal to or greater than 0 and equal to or less than 50 are taken as the eco range, and the numerical values of waste information which are greater than 50 and equal to or less than 100 are taken as the power range. Thus, where the waste information is equal to or greater than −100 and less than 0, it indicates a running state that belongs to the charge range, where the waste information is equal to or greater than 0 and equal to or less than 50, it indicates a running state that belongs to the eco range, and where the waste information is greater than 50 and equal to or less than 100, it indicates a running state that belongs to the power range.

Thus, the display unit 9 has a display area 9*b* indicating the running state that belongs to the eco range. Where the numerical value of the waste information derived by the waste derivation unit 15 is within the eco range, a current position identified and displayed in the display area 9b (in this case, indication position indicated by the indication member 9a) is identified and displayed according to the numerical value of the waste information. The display unit 9 thus displays the degree of the waste of energy.

The display control unit 16 rotates the indication member 9a with an actuator (not shown in the figure), or the like, according to the numerical value indicated by the waste information, thereby displaying on the display unit 9 whether the running state belongs to the charge range, eco range, or power range by the indication position of the indication member 9a. Further, the display unit 9 shows the waste information as the indication position, and graphically shows the upper limit value and lower limit value of the charge range, eco range, and power range as an area in the meter together with the numerical values.

In the case explained herein, the display unit 9 displays the numerical values of the upper limit value and lower limit value with respect to the charge range, eco range, and power range, but the numerical values are not necessarily displayed on the display unit 9.

Figure 5:
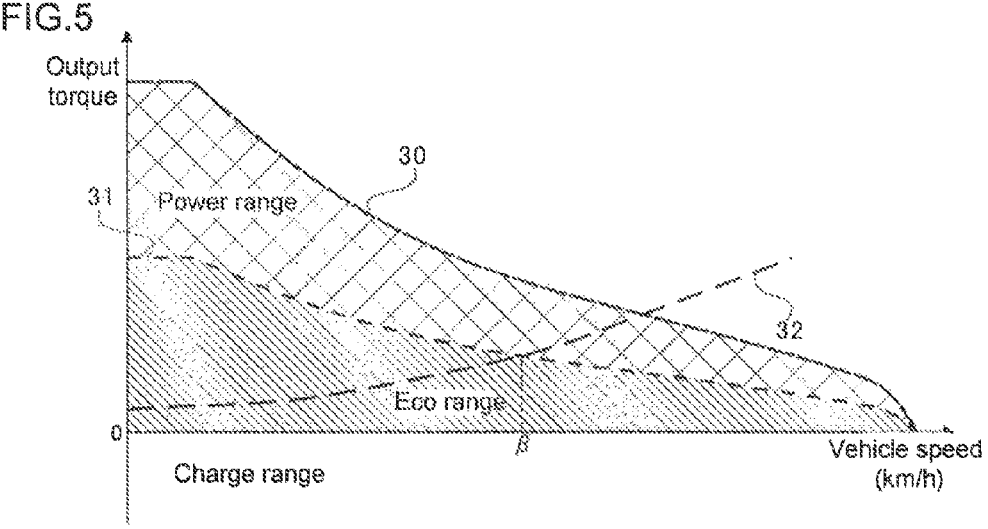
FIG. 5 illustrates the power range and eco range in the display device for a vehicle of a comparative example.

FIG. 5 illustrates the power range and eco range in the onboard display device of a comparative example. In the onboard display device of a comparative example, it is displayed whether a running state belongs to the charge range, eco range, or power range according to the output rate.

In FIG. 5, a broken line 30 indicates the rated torque of the drive motor 3, and a broken line 31 indicates the output torque at an output rate of 50%. In the example depicted in FIG. 5, the power range is assumed when the output rate exceeds 50%, the eco range is assumed when the output rate is between 0% and 50%, and the charge range is assumed when the output rate is less than 0%.

Further, a broken line 32 indicates an output torque that is in balance with the running resistance of the electric automobile 1. Examples of running resistance factors include air resistance, rolling resistance of the wheels 2 against the road, and the inertia momentum of the drive system of the electric automobile 1. The air resistance is determined by the surface area of the electric automobile 1, as viewed from the front surface.

According to the broken line 32, the output torque also increases as the vehicle speed rises. It indicates that the running resistance increases as the vehicle speed rises, and therefore the output torque, which is in balance with the running resistance, also increases.

Further, where the output torque indicated by the broken line 32 in the electric automobile 1 is maintained, the current vehicle speed, as a rule, can be maintained. The output torque indicated by the broken line 32 will be called hereinbelow a maintained torque. In this case, however, the slope of the road and braking with the brakes are not taken into account.

As shown in FIG. 5, the magnitude relationships between the value of the output torque and the vehicle speed, which are represented by the broken line 31 indicating the boundary of the power range and eco range, and the broken line 32 indicating the maintained torque, are reversed, with the vehicle speed β as a boundary. In a speed region above the vehicle speed β, the current vehicle speed cannot be maintained even at an output rate of 50%. Further, in a speed region below the vehicle speed β, the output torque becomes too high to maintain the current vehicle speed at an output rate of 50%.

Thus, in the display device for a vehicle of the comparative example, in a speed region below the vehicle speed β, although the output torque is larger than the maintained torque indicated by the broken line 32 and the waste of energy can be large, the eco range is sometimes displayed.

Likewise, in the display device for a vehicle of the comparative example, in a speed region above the vehicle speed β, although the output torque is less than the maintained torque indicated by the broken line 32 and the waste of energy can be small, the power range is sometimes displayed.

Thus, the waste of energy in the running vehicle is difficult to suppress while referring to information displayed on the display device for a vehicle of the comparative example.

Figure 6:
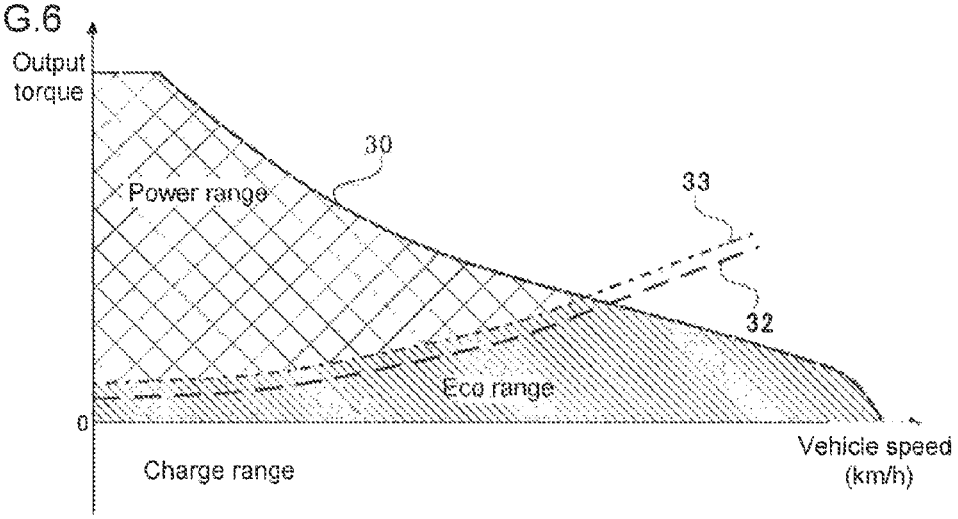
FIG. 6 is an explanatory drawing illustrating the concept of the power range and eco range of the display device for a vehicle of the present implementation.

FIG. 6 is an explanatory drawing illustrating the concept of the power range and eco range in the display device 11 for a vehicle of the present implementation. As shown in FIG. 6, in the display device 11 for a vehicle, a dot-dash line 33 indicating the boundary of the power range and eco range, does not cross the broken line 32, which indicates the maintained torque, in the rated torque range (below the broken line 30 in FIG. 6). Such a form of the dot-dash line 33 is obtained, for example, by adding a constant to the broken line 32 and shifting (parallel transfer) it in the vertical axis direction.

Since the boundary (dot-dash line 33) of the power range and eco range is set to be shifted upward by a constant value with respect to the maintained torque (broken line 32), regardless of the vehicle speed, the power range is not displayed on the display unit 9 when the output torque is less than the maintained torque, which is shown by the broken line 32, as happens in the comparative example. In other words, where the output torque is within the range of the maintained torque which is required for maintaining the current vehicle speed, the eco mode is necessarily displayed on the display unit 9.

Where the boundary between the power range and eco range is taken as the broken line 32, which indicates the maintained torque, where the maintained torque is exceeded even to a very small degree, the power range is displayed. In such a case, the displayed information is not suitable as information indicating the waste status of energy.

By providing an appropriate range determined as the eco range between the boundary (dot-dash line 33) of the power range and eco range and the maintained torque (broken line 32), it is possible to display the eco mode on the display unit 9, unless the output torque is extremely large by comparison with the maintained torque.

The display device 11 for a vehicle of the present implementation is based on the concept of setting the power range and eco range illustrated by FIG. 6. Accordingly, the following setting makes it possible to display the waste status of energy even more adequately.

FIG. 7 is an explanatory drawing illustrating in detail the power range and eco range in the display device 11 for a vehicle of the present implementation. As shown in FIG. 7, with the power range and eco range of the present implementation, in a predetermined speed range (in this case, 60 km/h to 100 km/h), which has been set in advance, a solid line 34 indicating the boundary of the power range and eco range is approximately the same as the dot-dash line 33 depicted in FIG. 6.

Meanwhile, where the electric automobile 1 accelerates from the stopping state, an output torque which is larger than the maintained torque is obviously required, and the information that has been displayed as the power range with a large waste of energy before such a running state is not suitable as information indicating the waste status of energy.

Accordingly, as depicted in FIG. 7, in a low speed region in which the vehicle speed is less than a lower limit value (in this case, 60 km/h) of the predetermined speed range, the solid line 34 has a constant value (a) of the output torque and deviates upward, as indicated in FIG. 7, from the broken line 32 depicting the maintained torque. Thus, with such a setting, the eco range is supposed to be from the dot-dash line 33 depicted in FIG. 6 to a larger output torque.

Where the vehicle speed is substantially higher than a legal speed, or the like, information indicating the waste status of energy is not adequately represented by displaying the eco range with a small waste of energy, despite the fact that the output torque is balanced with the maintained torque.

Accordingly, in a high speed region in which the vehicle speed is higher than the upper limit value (in this case, 100 km/h) of the predetermined speed range, the solid line 34 has a constant value (b), crosses the broken line 32 depicting the maintained torque, and deviates downward, as shown in FIG. 7, from the broken line 32 on the high-speed side with respect to the crossing point. Thus, with such a setting, the power range is supposed to be from the dot-dash line 33 depicted in FIG. 6 to a smaller output torque.

In FIGS. 6 and 7, the power range and eco range are explained on the coordinate axes of the vehicle speed and output torque, while omitting the specific numerical values serving as waste information. The numerical values of waste information which have been set in advance so as to realize the correspondence relationship between the vehicle speed, output torque, power range and eco range such as shown in FIG. 7, and the indication position of waste information on the meter of the display unit 9 are explained hereinbelow in detail with reference to FIG. 8 and FIGS. 9A to 9F.

FIG. 8 is an explanatory drawing illustrating a waste information derivation table. In FIG. 8, the rows represent the output rate, and the columns represent the vehicle speed. The numerical values specified by the rows of the output rate and the columns of the vehicle speed represent waste information. The waste derivation unit 15 derives the numerical values as waste information by referring to the waste information derivation table depicted in FIG. 8.

Where the numerical values between those in the rows and columns are referred to, such values being, for example, an output rate of 20% and a vehicle speed of 25 km/h, they are replaced with the values closest thereto in the rows and columns to specify the waste information. For example, where the output rate is 25% and the vehicle speed is 40 km/h, the output rate is replaced with 30%, which is the value closest thereto in the table, and "25" is taken, as a numerical value corresponding to an output rate of 30% and a vehicle speed of 40 km/h, as the waste information. Further, where the output rate is exactly between two closest values, as for example, an output rate of 20%, it is replaced with the larger output rate (in this case, output rate 30%).

The table illustrated in FIG. 8 is an example of the waste information derivation table, and may be further subdivided to increase the number of rows and columns. For example, values interpolated by proportional computations may be used. In this case, for example, where the output rate is 25% and the vehicle speed is 40 km/h, "22.5" is taken, as the waste information, as a value interpolated by proportional computations between the values corresponding to 40 km/h in the rows with an output rate of 10% and 30%.

Figure 9A:
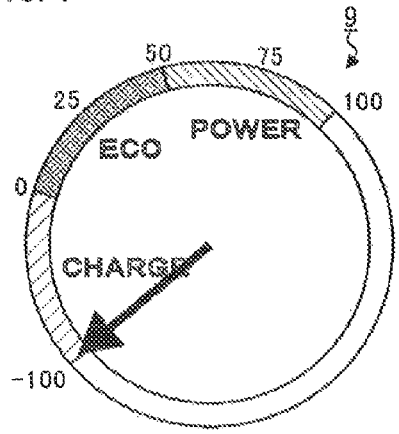
FIGS. 9A to 9F illustrate display examples of the display unit of the present implementation and a comparative example.
Figure 9D:
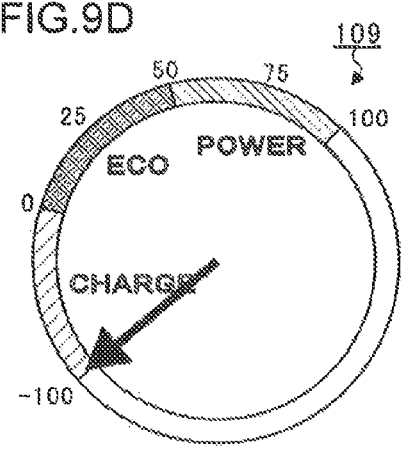
Figure 9B:
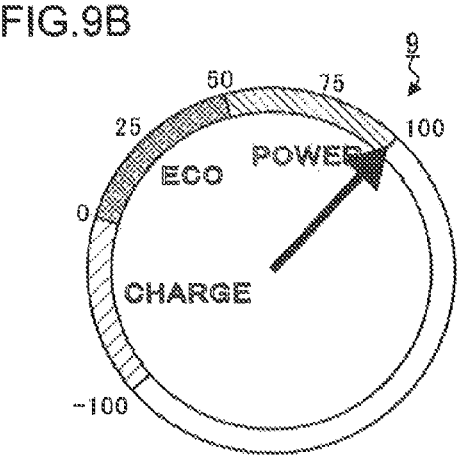
Figure 9E:
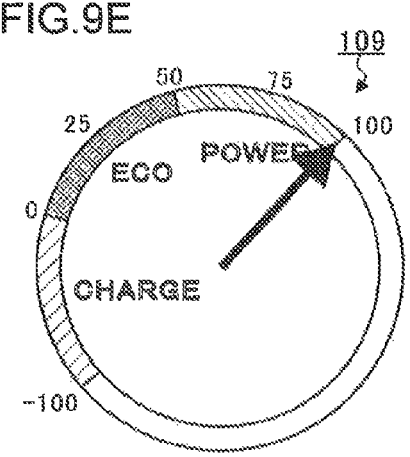
Figure 9C:
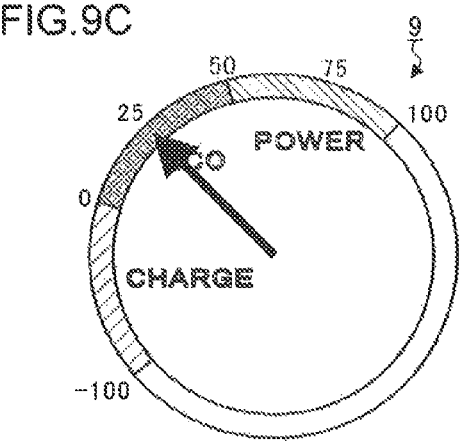
Figure 9F:
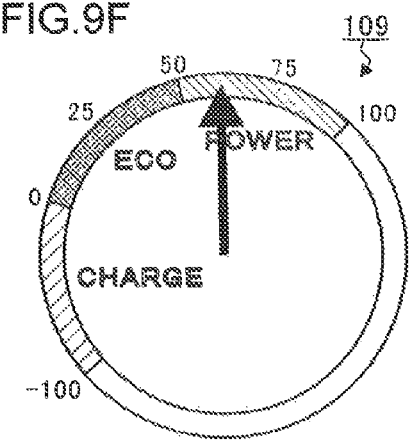

FIGS. 9A to 9F illustrate display examples of the display unit 9 of the present implementation and a comparative example. FIGS. 9A to 9C illustrate the display example of the display unit 9 of the present implementation, and FIGS. 9D to 9F illustrate the display example of the display unit 109 of the comparative example.

As shown in FIG. 8 when the vehicle speed is 60 km/h and the output rate is −100%, the waste information is "−100". In this case, as shown in FIGS. 9A and 9D, the display form on the display unit 9 of the present implementation and the display unit 109 of the comparative example is the same.

Further, as shown in FIG. 8, when the vehicle speed is 60 km/h and the output rate is 100%, the waste information is "100". In this case, as shown in FIGS. 9B and 9E, the display form on the display unit 9 of the present implementation and the display unit 109 of the comparative example is the same.

However, for example, when the vehicle speed is 100 km/h and the output rate is 60%, as shown in FIGS. 9C and 9F, the display forms on the display unit 9 of the present implementation and the display unit 109 of the comparative example are different. The reason therefor is explained below.

For example, as shown in FIG. 8, when the vehicle speed is within the predetermined speed range and the output rate is within the first output range (in this case, an output rate of 10% to 95%), the waste information decreases gradually where the values in each row are compared from left to right. Thus, the waste information assumes a smaller value at a larger vehicle speed, even when the output rate is the same.

Thus, when the vehicle speed is within the predetermined speed range and the output rate is within the first output range, the waste derivation unit 15 derives the waste information indicating a smaller energy waste when the vehicle speed is high than when the vehicle speed is low, even when the output rate is the same.

As a result, by contrast with the above-described comparative example, in which the power range and eco range are uniformly determined by the output rate, the waste information is derived such as to allow the output torque to increase with the increase in the maintained torque. As a result, the display unit 9 can display information indicating the adequate waste status of energy that takes into account the maintained torque.

More specifically, as shown in FIG. 9F, in the display unit 109 of the comparative example, when the vehicle speed is 100 km/h and the output rate is 60%, the power range is displayed only by the output rate. Meanwhile, in the present implementation, the waste information is derived as "25" with the waste information derivation table which takes into account that the maintained torque at a vehicle speed of 100 km/h becomes larger than that in a low-speed region. Thus, as indicated in FIG. 9C, the display unit 9 displays that the current running state is the eco range.

Further, as indicated in FIGS. 9A to 9F, the numerical value "25" of the waste information indicates the center position displayed at the same distance from the upper limit value (numerical value 50) and the lower limit value (numerical value 0) in the eco range. In FIG. 8, the below-described second output range including the numerical value 25 is hatched.

In this case, where the vehicle speed is within a predetermined speed range, the waste information is "25" in the case in which the output rate is within the second output range including the output rate at which the output torque is equal to the maintained torque. For example, when the vehicle speed is 60 km/h, the output rate in the second output range is equal to or greater than 20% and less than 35%, when the vehicle speed is 80 km/h, the output rate in the second output range is equal to or greater than 35% and less than 45%, when the vehicle speed is 90 km/h, the output rate in the second output range is equal to or greater than 45% and less than 55%, and when the vehicle speed is 100 km/h, the output rate in the second output range is equal to or greater than 55% and less than 70%.

Thus, the display unit 9 displays a central position in the eco range as the waste information derived when the vehicle speed is within the predetermined speed range and the output rate is within the second output range including the output rate at which the current vehicle speed is maintained.

Therefore, the display of the central position of the eco range on the display unit 9 easily leads to an intuitive conclusion that in a predetermined speed range, from which the abovementioned low-speed region and high-speed region have been deleted, the output torque approximately equal to the maintained torque is maintained, the vehicle runs at an approximately constant speed, and the waste of energy is suppressed.

Further, as shown in FIG. 8, in a low-speed region in which the vehicle speed is less than the lower limit value (60 km/h) of the predetermined speed range, the output rate at which the waste information is "25" is 30%. In the low-speed region, since the running resistance is small, the output rate at which the output torque is balanced with the maintained torque is less than 30%. More specifically, for example, the waste information at an output rate of 10% and a vehicle speed of 0 km/h, 3 km/h, 20 km/h, and 40 km/h has a value less than "25", as indicated in FIG. 8.

In other words, in the low-speed region, the output torque at an output rate of 30% is greater than the maintained torque. Thus, "25" is derived as the waste information which is derived when the vehicle speed is less than the lower limit value of the predetermined speed range and the output rate which is greater than the output rate at which the current vehicle speed is maintained (in this case, when the output rate is equal to or greater than 20% and less than 35%), and the display unit 9 displays the central position in the eco range as the waste information.

Therefore, even when the output torque is larger than the maintained torque in the low-speed region, where this is the range with appropriate acceleration, the display unit 9 displays the central position in the eco range as the waste information, and the waste status of energy can be adequately displayed.

Further, as shown in FIG. 8, in a high-speed region that is equal to or greater than a predetermined value (110 km/h) which is higher than the upper limit value (100 km/h) of the predetermined speed range, the output rate at which the waste information is "25" is 60%. In the high-speed region, since the running resistance is large, the output rate at which the output torque is balanced with the maintained torque is greater than 60%. More specifically, for example, the waste information at an output rate of 80% has a value greater than "25", as indicated in FIG. 8.

In other words, in the high-speed region, the output torque at an output rate of 60% is less than the maintained torque. Thus, "25" is derived as the waste information which is derived when the vehicle speed is equal to or higher than a predetermined value (in this case, a vehicle speed of 110 km/h indicated in FIG. 7), which is higher than the upper limit value of the predetermined speed range, and the output rate is lower than the output rate at which the current vehicle speed is maintained (in this case, when the output rate is equal to or greater than 55% and less than 70%), and the display unit 9 displays the central position in the eco range as the waste information.

The predetermined value is a vehicle speed at the intersection of the broken line 32 and the solid line 34 in FIG. 7. Where the vehicle speed is equal to or greater than the predetermined value, the broken line 32 indicating the maintained torque is included in the power range, as depicted in FIG. 7.

As mentioned hereinabove, in the high-speed region, where the legal speed, or the like, is substantially exceeded, information indicating the waste status of energy is not adequately represented by displaying the eco range with a small waste of energy, despite the fact that the output torque is balanced with the maintained torque.

Accordingly, when the output torque is less than the maintained torque in the high-speed region, the display unit 9 displays the central position in the eco range as the waste information. Therefore, the waste status of energy can be displayed more adequately than in the case in which the central position in the eco range is simply displayed when the output torque is equal to the maintained torque.

Further, in FIG. 8, the third output range including the output rate of 0 is cross-hatched. In this case, the third output range has the output rate equal to or higher than −4% and less than 5.5%. The waste information is 0 in the entire third output range.

Thus, in the third output range including the output rate of 0%, the display unit 9 stops and displays the indication position at a predetermined position.

Therefore, the waste information is fixed to 0 and the fluctuations of the indication position can be suppressed even when the electric automobile 1 is temporarily stopped or when the electric automobile 1 moves at a very low speed, that is, creeps.

In the above-described implementation, the case is explained in which the waste derivation unit 15 derives the waste information with a waste information derivation table, but the waste derivation unit 15 may also derive the waste information with a predetermined mathematical formula.

Further, in the above-described implementation, the case is explained in which the display unit 9 is a meter and the waste information is represented by the indication position of the meter, but the display unit 9 may also indicate the waste information with another graph. Further, for example, the configuration including a light-up button may be also used that is lit up when the waste of energy, which is consumed by the running electric automobile 1 is large or small. Also in this case, when the vehicle speed is within the predetermined vehicle range, which has been set in advance, and the output rate is within the first output range, the waste derivation unit 15 derives the waste information indicating that the waste of energy when the vehicle speed is high is less than when the vehicle speed is low, even when the output rate is the same. On the basis of the waste information that has thus been derived, the display control unit 16 may determine whether to switch on or off the display unit 9.

Further, in the above-described implementation, the waste information is explained with respect to the case in which the waste of energy is larger when the numerical value is larger, but the waste information may be also such that the waste of energy is large when the numerical value is small.

Further, in the above-described implementation, the case is explained in which the display unit 9 stops and displays the indication position at the predetermined position when the output rate is within the third output range including an output rate of 0%, but the display unit 9 may also not to stop or display the indication position at the predetermined position even when the output rate is within the third output range including an output rate of 0%.

Further, in the above-described implementation, the case is explained in which the display device 11 for a vehicle is installed on the electric automobile 1, but the display device 11 for a vehicle may be also installed on a hybrid automobile. In this case, a drive unit that drives the vehicle is constituted by a drive motor and an engine, and the system rated output (system rated performance) of the drive motor and engine is used as the rated output of the vehicle.

The preferred implementation of the present invention is explained hereinabove with reference to the appended drawings, but it goes without saying that the present invention is not limited to this implementation. It is obvious that a person skilled in the art could conceive of various variation examples or modification examples within the scope of the claims, and those examples are obviously also intended to be included in the technical scope of the present invention.

The present invention can be used in a display device for a vehicle that displays information on the energy consumed by the vehicle.

The invention claimed is:

1. A display device for a vehicle, comprising:
a vehicle speed acquisition unit that acquires speed information indicating a vehicle speed;
an output acquisition unit that acquires output information indicating an output of a drive unit that drives the vehicle;
an output rate derivation unit that derives an output rate indicating a ratio of the output to a rated output of the vehicle at a current vehicle speed, on the basis of the speed information and the output information;
a waste derivation unit that derives waste information indicating a degree of waste of energy consumed by the vehicle according to the speed information and the output rate; and
a display unit that displays a waste status of the energy on the basis of the waste information, wherein
when the vehicle speed is within a predetermined speed range and the output rate is within a preset first output range, the waste derivation unit derives the waste information based on a predetermined maintained torque for maintaining the current vehicle speed, the predetermined maintained torque being based on a predetermined boundary indicating a boundary between a power range and an eco range, the waste information indicating that the waste of energy when the vehicle speed is high is less than when the vehicle speed is low, even when the output rate is the same.

2. The display device for a vehicle according to claim 1, wherein
the waste derivation unit derives a numerical value as the waste information from the speed information and the output rate, and
the display unit displays whether a running state belongs to the power range indicating that the waste of energy is large or the eco range indicating that the waste of energy is small, according to the numerical value as the waste information.

3. The display device for a vehicle according to claim 2, wherein the display unit has a display area indicating the running state belonging to the eco range, and indicates the degree of waste of energy by a current position that is identified and displayed in the display area.

4. The display device for a vehicle according to claim 3, wherein when the output rate is in a third output range including 0, the display unit stops and displays the indication position at a predetermined position.

5. The display device for a vehicle according to claim 1, wherein
the waste derivation unit derives the waste information indicating a running state as belonging to either the power range in which the waste of energy is large or the eco range in which the waste of energy is small,
the predetermined boundary indicating a boundary between the power range and the eco range is based on the current vehicle speed, and the waste derivation unit derives the waste information indicating that the running state belongs to the eco range when the output of the drive unit is below the predetermined boundary, and
the predetermined boundary increases, at least within a predetermined range of vehicle speed, as the current vehicle speed increases.

6. The display device for a vehicle according to claim 5, wherein
the predetermined boundary is constant in a region of vehicle speed below the predetermined range of vehicle speed.

7. The display device for a vehicle according to claim 5, wherein
the predetermined boundary is constant in a region of vehicle speed above the predetermined range of vehicle speed.

8. The display device for a vehicle according to claim 1, wherein
the waste derivation unit derives the waste information indicating a running state as belonging to either the power range in which the waste of energy is large or the eco range in which the waste of energy is small, and
the waste derivation unit derives the waste information indicating that the running state belongs to the eco range when the output of the drive unit is within a preset range of the predetermined maintained torque.

9. The display device for a vehicle according to claim 8, wherein
the preset range, within which the waste derivation unit derives the waste information indicating that the running state belongs to the eco range, includes outputs in excess of the predetermined maintained torque.

10. The display device for a vehicle according to claim 8, wherein
the preset range, within which the waste derivation unit derives the waste information indicating that the running state belongs to the eco range, is set, at least within a predetermined range of vehicle speed, as a parallel transfer shift of the predetermined maintained torque.

11. The display device for a vehicle according to claim 8, wherein
the waste derivation unit derives the waste information indicating that the running state belongs to the eco range when the output of the drive unit is within a preset range of the predetermined maintained torque, even when the output of the drive unit exceeds the rated output of the vehicle at the current vehicle speed.

12. A display device for a vehicle, comprising:
a speed sensor for acquiring a vehicle speed of the vehicle;
an output sensor for acquiring an output of a drive unit that drives the vehicle;
a controller that receives the vehicle speed acquired by the speed sensor and the output acquired by the output sensor, and derives an energy waste status of the vehicle; and
a display unit that displays the energy waste status of the vehicle,
wherein the controller comprises vehicle performance data, the vehicle performance data comprising maintaining output data and boundary output data, wherein the maintaining output data defines a maintaining output value for output of the drive unit as a function of vehicle speed, the maintaining output value being an output value that is required to maintain the vehicle at a corresponding vehicle speed, the boundary output data defines a boundary output value for output of the drive unit as a function of the maintaining output value, wherein the controller derives the maintaining output value that is defined as a function of the vehicle speed acquired by the speed sensor; and derives the boundary output value that is defined as a function of the derived maintaining output value, and wherein the controller derives the energy waste status of the vehicle by comparing the output acquired by the output sensor with the derived boundary output value; and, when the output acquired by the output sensor is judged to be above the derived boundary output value, controls the display unit to display an energy waste status indicating a relatively high energy waste status; and, when the output acquired by the output sensor is judged to be below the derived boundary output value, controls the display unit to display an energy waste status indicating a relatively low energy waste status.

13. The display device for a vehicle according to claim 12, wherein the vehicle performance data comprising the maintaining output data and the boundary output data is in the form of a derivation table.

14. The display device for a vehicle according to claim 12, wherein the function by which the boundary output data defines the boundary output value is one wherein the boundary output value is calculated by the addition of a constant value to the maintaining output value.

15. The display device for a vehicle according to claim 12, wherein the function by which the boundary output data defines the boundary output value is one wherein:

in a first speed range, from a zero speed to a lower limit speed value, the boundary output value is set to a first constant value, in a second speed range, from the lower limit speed value to an upper limit speed value, the boundary output value is calculated by the addition of a constant value to the maintaining output value, and in a third speed range, from the upper speed limit and above, the boundary output value is set to a second constant value.

16. A display device for a vehicle, comprising:

a speed sensor for acquiring a vehicle speed of the vehicle;

an output sensor for acquiring an output of a drive unit that drives the vehicle;

a controller that receives the vehicle speed acquired by the speed sensor and the output acquired by the output sensor, and derives an energy waste status of the vehicle; and a display unit that displays the energy waste status of the vehicle, wherein the controller comprises vehicle performance data, the vehicle performance data comprising boundary output data that defines a boundary output value for output of the drive unit as a function of vehicle speed, the boundary output data defining lower boundary output values at lower vehicle speeds and higher boundary output values at higher vehicle speeds, wherein the controller derives a boundary output value that is defined as a function of the vehicle speed acquired by the speed sensor, and wherein the controller derives the energy waste status of the vehicle by comparing the output acquired by the output sensor with the derived boundary output value; and, when the output acquired by the output sensor is judged to be above the derived boundary output value, controls the display unit to display an energy waste status indicating a relatively high energy waste status; and when the output acquired by the output sensor is judged to be below the derived boundary output value, controls the display unit to display an energy waste status indicating a relatively low energy waste status.

17. The display device for a vehicle according to claim 16, wherein the vehicle performance data comprising the boundary output data is in the form of a derivation table.

18. The display device for a vehicle according to claim 16, wherein the function by which the boundary output data defines the boundary output value is one wherein:

in a first speed range, from a zero speed to a lower limit speed value, the boundary output value is set to a first constant value, in a second speed range, from the lower limit speed value to an upper limit speed value, the boundary output value is made to gradually increase from the first constant value to a second constant value as a function of vehicle speed, and in a third speed range, from the upper speed limit and above, the boundary output value is set to the second constant value.

* * * * *